US012776585B2

(12) United States Patent
Murphey et al.

(10) Patent No.: US 12,776,585 B2
(45) Date of Patent: Oct. 27, 2026

(54) FOLDABLE REFLECTOR WITH TENSIONED CABLE SPOKE SYSTEM

(71) Applicants: Thomas W. Murphey, Fort Collins, CO (US); Patrick A. Rodriguez, Fort Collins, CO (US); Daniel Hunt, Fort Collins, CO (US); Levi Nicholson, Wellington, CO (US)

(72) Inventors: Thomas W. Murphey, Fort Collins, CO (US); Patrick A. Rodriguez, Fort Collins, CO (US); Daniel Hunt, Fort Collins, CO (US); Levi Nicholson, Wellington, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 264 days.

(21) Appl. No.: 18/200,835

(22) Filed: May 23, 2023

(65) Prior Publication Data

US 2023/0387601 A1 Nov. 30, 2023

Related U.S. Application Data

(60) Provisional application No. 63/345,584, filed on May 25, 2022.

(51) Int. Cl.
*H01Q 15/16* (2006.01)
*G02B 5/10* (2006.01)

(52) U.S. Cl.
CPC ............. *H01Q 15/161* (2013.01); *G02B 5/10* (2013.01)

(58) Field of Classification Search
CPC .... H01Q 15/161; H01Q 15/162; H01Q 15/20; H01Q 15/16; H01Q 15/148; H01Q 15/165; H01Q 15/167; F24S 23/715; F24S 2023/874; F24S 23/71; F24S 23/80; F24S 2023/83; G02B 26/0825; B64G 1/2222; B64G 1/44
See application file for complete search history.

(56) References Cited

U.S. PATENT DOCUMENTS 3,174,397 A * 3/1965 Sanborn .................. F24S 23/71 343/915
3,397,399 A * 8/1968 Carman ................ F24S 23/715 343/915
3,541,569 A * 11/1970 Acker .................. H01Q 15/161 343/915
3,558,219 A * 1/1971 Buckingham .......... B64G 99/00 359/851
3,599,218 A * 8/1971 Williamson ......... H01Q 15/163 343/915
3,617,113 A * 11/1971 Hoyer .................. H01Q 15/161 343/915

(Continued)

FOREIGN PATENT DOCUMENTS

CN 113682857 A 11/2021

*Primary Examiner* — Wyatt A Stoffa
(74) *Attorney, Agent, or Firm* — Harris Beach Murtha Cullina PLLC; James R. Muldoon

(57) ABSTRACT

A foldable reflector with tensioned cable spoke system includes a foldable reflector. A central cone extends outward from a center of the foldable reflector. An outer reflector ring is hingedly coupled to the foldable reflector at an outer perimeter of the foldable reflector. A plurality of cable spokes are mechanically coupled between the central cone and the outer reflector ring.

20 Claims, 12 Drawing Sheets

(56) References Cited

U.S. PATENT DOCUMENTS

| | | | | | |
|---|---|---|---|---|---|
| 3,699,576 | A * | 10/1972 | Hoyer | H01Q 15/16 | 343/915 |
| 3,717,879 | A * | 2/1973 | Ganssle | H01Q 15/162 | 343/915 |
| 4,030,102 | A * | 6/1977 | Kaplan | H01Q 15/161 | 244/172.6 |
| 4,315,265 | A * | 2/1982 | Palmer | H01Q 15/162 | 343/915 |
| 4,527,166 | A | 7/1985 | Luly | | |
| 5,198,832 | A * | 3/1993 | Higgins | H01Q 15/162 | 343/915 |
| 5,296,044 | A * | 3/1994 | Harvey | H02S 30/20 | 136/292 |
| 6,028,570 | A * | 2/2000 | Gilger | H01Q 15/161 | 343/915 |
| 6,138,998 | A * | 10/2000 | Parker | B64G 1/66 | 343/DIG. 2 |
| 6,152,579 | A * | 11/2000 | Reed | F21V 7/10 | 362/346 |
| 6,206,551 | B1 * | 3/2001 | Stubblefield, Jr. | F21V 7/18 | 362/346 |
| 6,340,956 | B1 * | 1/2002 | Bowen | H01Q 15/161 | 343/915 |
| 6,542,132 | B2 * | 4/2003 | Stern | H01Q 15/161 | 343/915 |
| 8,462,078 | B2 * | 6/2013 | Murphey | H01Q 19/12 | 343/915 |
| 9,331,394 | B2 * | 5/2016 | Toledo | H01Q 15/162 | |
| 10,236,590 | B1 * | 3/2019 | Footdale | H01Q 15/162 | |
| 10,587,035 | B2 * | 3/2020 | Freebury | H01Q 15/161 | |
| 10,601,142 | B2 * | 3/2020 | Henderson | H01Q 19/18 | |
| 11,381,001 | B2 * | 7/2022 | Onishi | B64G 1/66 | |
| 11,724,828 | B2 * | 8/2023 | Ruhl | B64G 1/2224 | 244/172.6 |
| 11,892,661 | B2 * | 2/2024 | Murphey | B64G 1/2222 | |
| 12,099,219 | B2 * | 9/2024 | Murphey | B64G 1/2222 | |
| 2004/0104861 | A1 * | 6/2004 | Schmid | B64G 1/2225 | 343/915 |
| 2009/0108193 | A1 * | 4/2009 | Kostiainen | H01J 49/168 | 250/281 |
| 2011/0187627 | A1 * | 8/2011 | Palmer | H01Q 15/161 | 343/915 |
| 2016/0225601 | A1 * | 8/2016 | Bajic | H01J 49/167 | |
| 2021/0167516 | A1 * | 6/2021 | Onishi | H01Q 1/288 | |
| 2021/0271007 | A1 * | 9/2021 | Murphey | G02B 27/0012 | |

* cited by examiner

SWATH ID HINGE FOLDING PHOOS

1

3

2

ALTERNATE VIEW-MID FOLD

FOLDABLE REFLECTOR WITH TENSIONED CABLE SPOKE SYSTEM

CROSS-REFERENCE TO RELATED APPLICATION(S)

This application claims priority to and benefit of co-pending U.S. provisional patent application Ser. No. 63/345,584, FOLDABLE REFLECTOR WITH TENSIONED CABLE SPOKE SYSTEM, filed May 25, 2022, which application is incorporated herein by reference in its entirety.

FIELD OF THE APPLICATION

The application relates to foldable surfaces, particularly to foldable reflectors.

BACKGROUND

Foldable reflectors are useful over a wide range of applications ranging from radio reception and transmission to optical telescopes and optical reflectors, such as those related to solar power generation. Foldable reflectors are generally used where the reflector is transported folded from one location to another location where the reflector is then deployed for use in its intended application. Folded reflectors are used in spaceflight applications where they are launched in a folded state and then later deployed in spaceflight.

SUMMARY

In illustrative embodiments, a reflector apparatus comprises a central member, a foldable reflector coupled to the central member and being configured to transition between a deployed condition and a non-deployed condition with the foldable reflector defining a reflective surface in a deployed state and one or more spokes coupled to the central member and the foldable reflector. The one or more spokes are configured to support the foldable reflector when at least in the deployed condition.

In some embodiments, the foldable reflector comprises a plurality of reflector elements with adjacent foldable elements foldably coupled to each other to enable the foldable reflector to transition to the nondeployed condition.

In certain embodiments, an outer ring is coupled to a peripheral portion of the foldable reflector and the one or more spokes coupled to the outer ring. A plurality of spokes may be provided with each spoke coupled to the central member and the outer ring. In some embodiments, the reflector elements are foldably coupled to the central member. In embodiments, the reflector elements are coupled to one end segment of the central segment and the spokes are coupled to an opposed end segment of the central segment.

In some embodiments, a foldable reflector with tensioned cable spoke system includes a foldable reflector. A central cone extends outward from a center of the foldable reflector. An outer reflector ring is hingedly coupled to the foldable reflector at an outer perimeter of the foldable reflector. A plurality of cable spokes are mechanically coupled between the central cone and the outer reflector ring.

The foldable reflector can include a plurality of foldable reflector elements hingedly coupled to each other, the plurality of foldable reflector elements forming a reflective surface in a deployed state. Each foldable reflector element can include a gore. Each gore can be hingedly coupled to the central cone.

The central cone can include a cable spoke termination ring disposed near or at a second end of the central cone, opposite to a first end of the central cone coupled to the foldable reflector. The central cone can include a first end at the foldable reflector and a second end opposite the first end, where the first end and the second end have a substantially same radius, the central cone including a cylinder. The central cone can include a first end at the foldable reflector and a second end opposite the first end, where the first end of the central cone has a first end radius greater than a second end radius. The second end radius can include a point connect for the plurality of cable spokes. The plurality of cable spokes are tangentially coupled to a second end of the central cone. At least one cable spoke of the plurality of cable spokes can include an adjustable length defined by a distance between the central cone and the outer reflector ring. The adjustable length can be adjusted by a motor.

The adjustable length can be adjusted by an actuator. The adjustable length can be adjusted by a piezo actuator. The adjustable length can be adjusted to compensate for a thermal warping. The adjustable length can be adjusted to compensate for a dynamic force. The adjustable length can be adjusted to compensate for a wavefront or optical correction.

A second cone ring can be disposed near a first cone ring, the second cone ring terminating a second set of cable spokes disposed between the central cone and the outer reflector ring. The second cone ring can rotate to control a deployment or a retraction of the foldable reflector. The second cone ring can include a mechanical damping component. The mechanical damping component can be based on a mechanical friction device or a viscous fluid device. The second cone ring can include a motor driven second cone ring.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
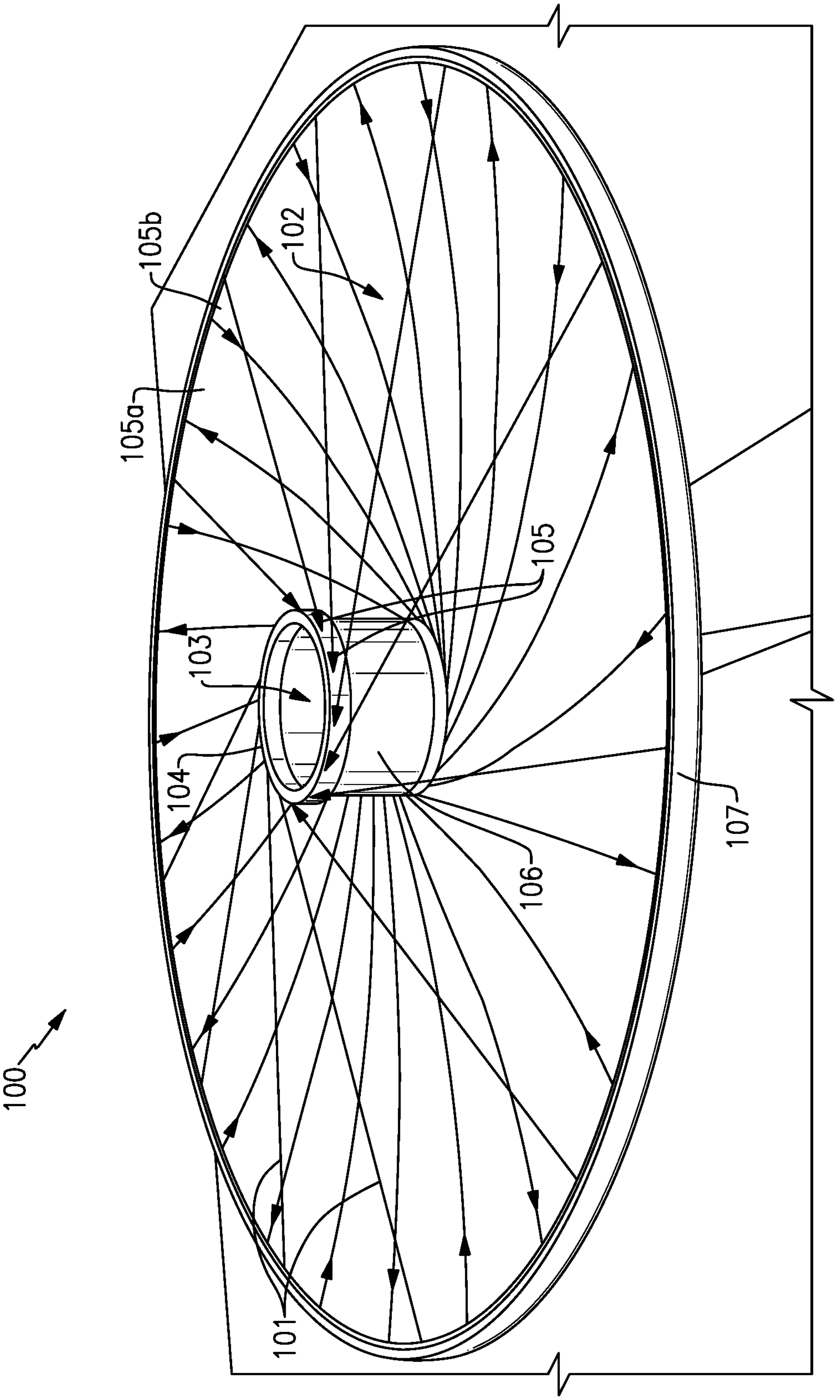
FIG. 1 is a drawing showing an exemplary foldable reflector with tensioned cable spoke system according to the Application.

FIG. 1 is a drawing showing an exemplary foldable reflector with tensioned cable spoke system according to the Application. As illustrated in FIG. 1, a foldable reflector with tensioned cable spoke system 100 includes a foldable reflector 102. A central cone 106 extends outward from a center of the foldable reflector 102. An outer reflector ring 107 is hingedly coupled to the foldable reflector 102 at an outer perimeter of the foldable reflector. A plurality of cable spokes 101 are mechanically coupled between the central cone 106 (e.g., at a cone ring 104) and the outer reflector ring 107.

A foldable reflector 100, can be provided, for example, by a plurality of foldable gores 105*a*, 105*b*, which can alternately fold into peaks and valleys. Such a gore based foldable reflective surface is described in detail in U.S. patent application Ser. No. 17/183,550, WRINKLE FREE FOLDABLE REFLECTORS MADE WITH COMPOSITE MATERIALS, by the same assignee, OPTERUS RESEARCH AND DEVELOPMENT, INC. Any other suitable foldable reflective surface can be used.

The reflective surface can be any suitable deployed curved surface. Typically, the reflective surface is substantially parabolic. However, any suitable foldable curve can be used. Suitable foldable curves include about flat surfaces, such as, for example, an about flat surface tilted at an angle to a plane about perpendicular to a central longitudinal axis of the cone.

It has been realized that foldable reflectors can be improved by the addition of spokes between an outer perimeter, typically an outer somewhat rigid ring in a deployed state, and a central cone. Spokes can add significant rigidity to the deployed reflector. The added rigidity afforded by these spokes can help to maintain a desired reflector shape in the presence of distorting factors. Distorting factors include, for example, thermal effects such as solar heating, and inertial effects, such as caused by a satellite re-positioning. While fixed spokes alone add significant rigidity to a foldable reflector in its deployed state, optional adjustable spokes offer an ability to tune the shape of a reflector, such as to compensate for adverse factors such as heat and inertial factors.

Note that the spokes typically approach the cable termination cone end at an angle off normal, in many cases substantially tangential to the curve of the cone. There can be a cone ring at the termination level of the cone, typically at a second end of the cone opposite a first end of the cone coupled to the foldable reflector substantially at the center of the reflective surface. Note that the cone can be of any suitable cone shape, where a cone is defined herein as including a cylinder where both end face cross sections are circles of substantially the same diameter, to a cone having a circular cross section at the first end which couples to the reflective surface, and a circle so small at the second end to be substantially a point where the spokes terminate at the point.

Figure 2:
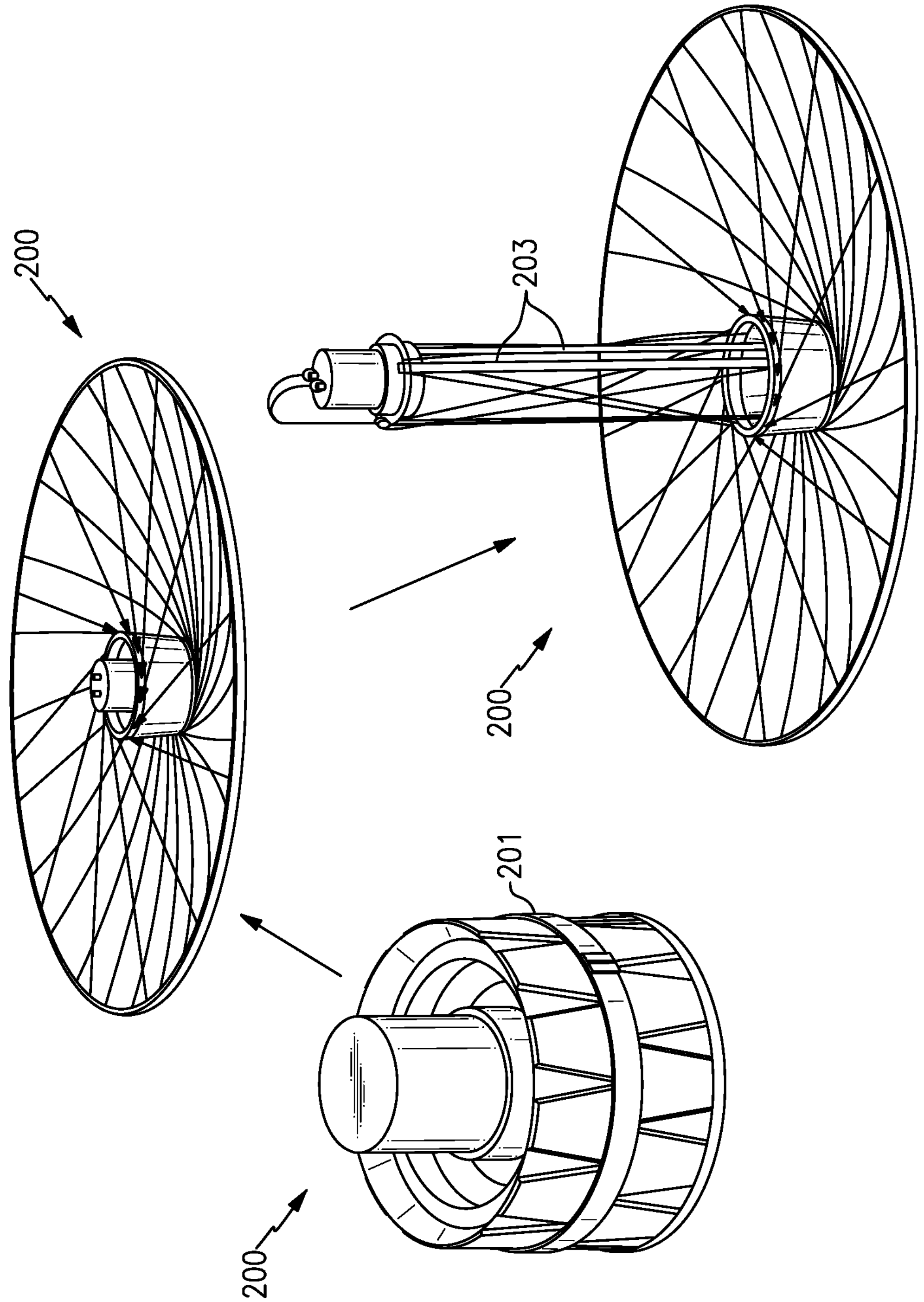
FIG. 2 is a drawing showing an exemplary deployment of a parabolic reflector 200 according to the Application.

FIG. 2 is a drawing showing an exemplary deployment of an exemplary 1.3 meter reflector development sequence, a parabolic reflector 200 according to the Application. FIG. 2 shows a deployment sequence where the reflector surface is deployed followed by deployment of the feed structure. At the bottom left, the deployable reflector is folded into about a cylindrical shape. A tie strap 201 can hold the foldable reflector closed against forces of potential energy which can act to open and deploy a passively deployed foldable reflector. At the top middle, the foldable reflector is fully deployed. At the lower right of FIG. 2 an optional boom 203 has been deployed as a feed arm, such as to support a radio or optical detector at about a focal point of the exemplary parabolic reflector 200. Boom 203 can be deployed either passively (e.g., potential energy of a rolled deformable boom), or actively, such as by a motor driven boom deployer (not shown in FIG. 2). An exemplary suitable active motor driven deployer is described in detail in U.S. patent application Ser. No. 17/650,132, BOOM DEPLOYER, by the same assignee, OPTERUS RESEARCH AND DEVELOPMENT, INC.

Figure 3B:
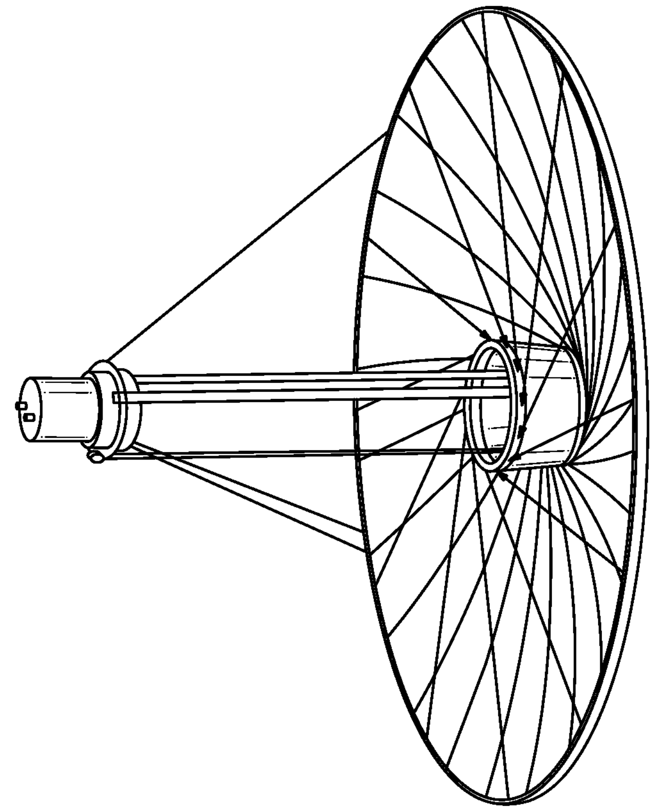
FIG. 3B is a drawing showing an exemplary foldable multiple beam boom in the deployed state.
Figure 3A:
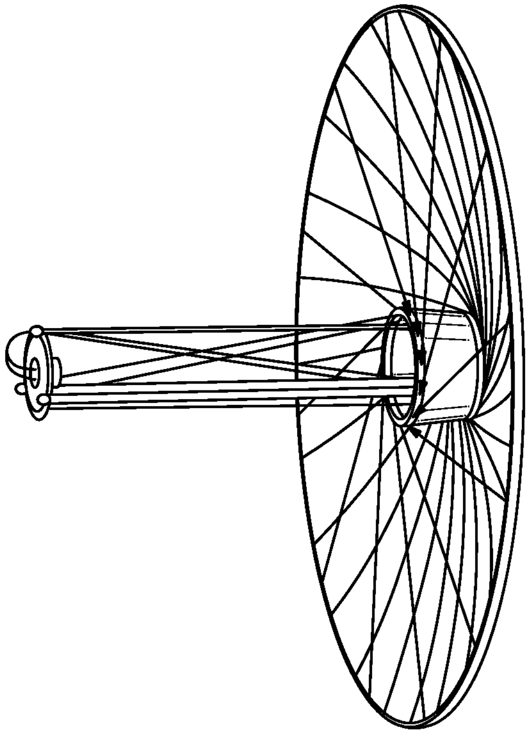
FIG. 3A is a drawing showing exemplary booms stabilized by diagonal elements.

FIG. 3A and FIG. 3B are drawings showing exemplary optional boom structures. FIG. 3A and FIG. 3B show two feed structure design options. FIG. 3A is a drawing showing an exemplary foldable trussed boom in the deployed state. FIG. 3B is a drawing showing an exemplary foldable multiple beam boom in the deployed state. Both options use rolled booms. In FIG. 3A, the booms are stabilized by diagonal elements as in a truss. In FIG. 3B, the booms are stabilized by guywires. In both cases, exemplary detectors 303 are shown at about a focal point of the exemplary parabolic reflectors.

Figure 4B:
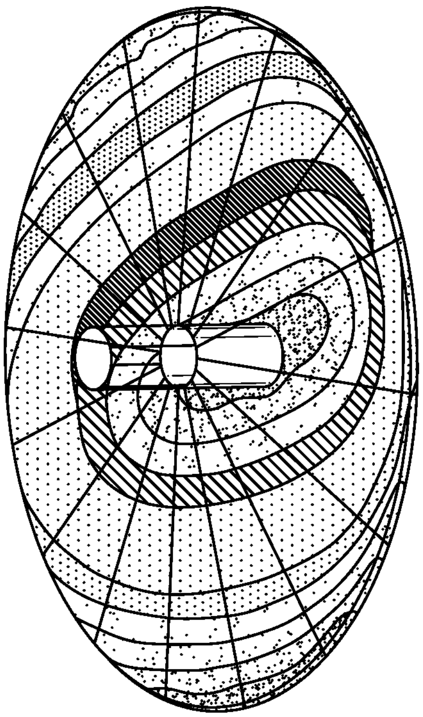
FIG. 4B is a drawing showing simulation results.
Figure 4A:
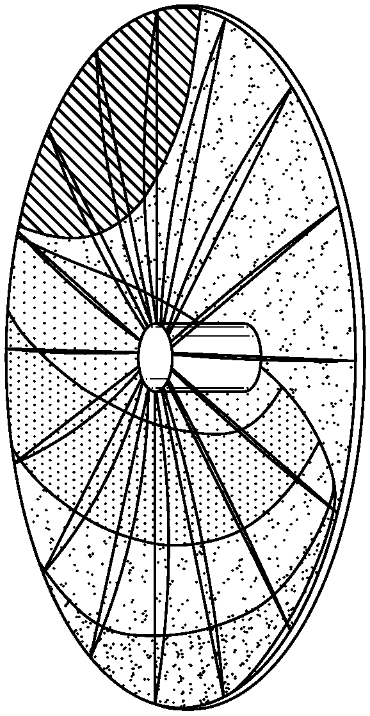
FIG. 4A is a drawing showing a fabricated reflector surface stabilized by tensioned stiff cables in a spoke configuration.

FIG. 4A and FIG. 4B are drawings showing deformation of the spokes and reflective surface of a foldable reflector. FIG. 4A is a drawing showing a fabricated reflector surface stabilized by tensioned stiff cables in a spoke configuration. The spokes are generally parallel to the gore fold lines. The spokes wrap around the central cone as the reflector surface is packaged. Spoke lengths can be adjusted to shape the reflector surface. FIG. 4B is a drawing showing simulation results. The image of FIG. 4A shows a high first mode vibration frequency and the right image shows thermal stability. The reflector of FIG. 4A can be seen to be deforming to where the spokes on the left side show some sagging (the sagging may be less visible in the drawing). The foldable reflector on the right includes a contour graph which shows a deformative parameter varying across the reflective surface, such as can be caused by thermal or inertial factors.

Figure 5A:
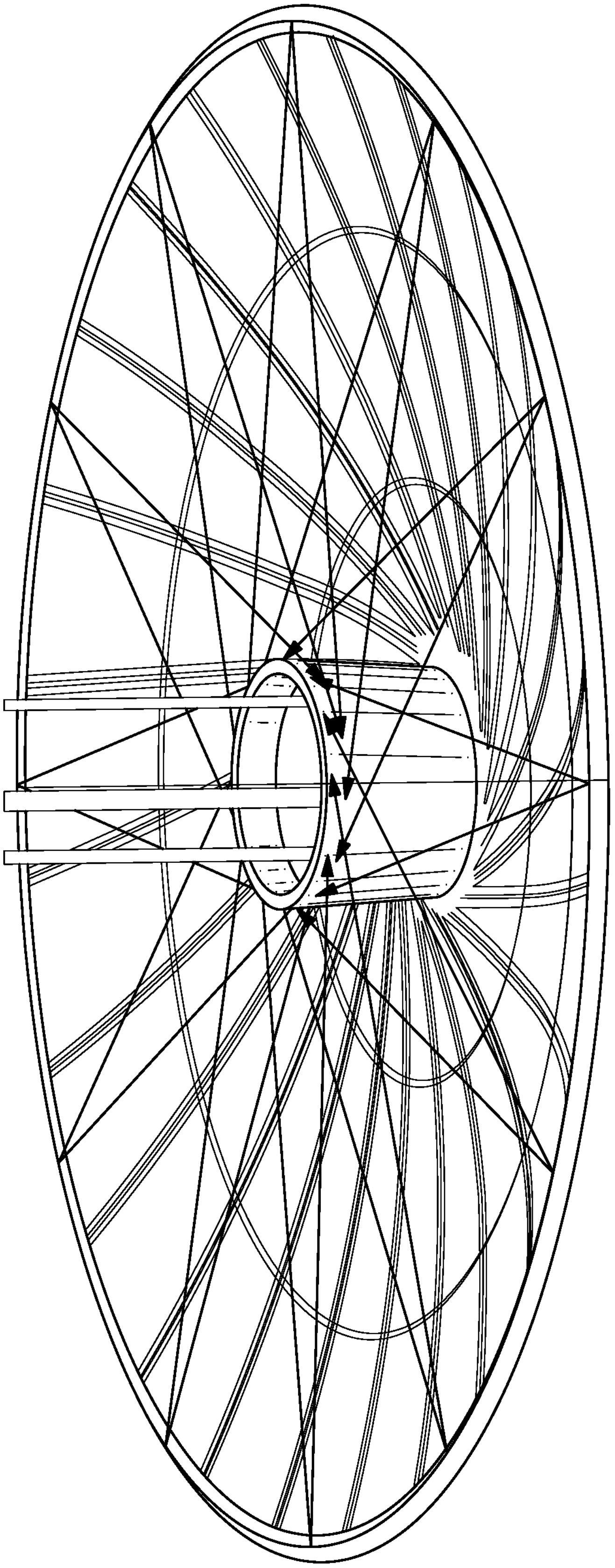
FIG. 5A is a drawing showing foldable reflector with tensioned cable spoke system with two layers of spokes.

FIG. 5A is a drawing showing foldable reflector with tensioned cable spoke system with two layers of spokes. Here, two independent sets of spokes at about the far end of the central cone (opposite to the surface of the reflector) are used. The lower set (closest to the reflector surface) is used for tensioning and is connected to a fixed lower ring while the upper set (farthest from the reflector surface) is used for deployment control and is attached to an upper rotating ring. The rotating ring can be rotated (e.g., about 20 degrees more off a position with taught spokes) to allow the deployment control spokes to go slack, such as is shown in FIG. 5C. The rotating ring can also be positioned below the fixed ring. FIG. 5A shows a second set of spokes rotating in the opposite direction to the first set.

The second set of spokes payed outwardly to control the deployment of the antenna. They start partially wrapped around the central cone and as they are slackened, the reflector is allowed to unwrap. The second layer spokes can tangentially approach a rotatable ring at the spoke termination level of the cone from a different or an opposite direction of the first layer of spokes.

A rotatable ring can rotate about the cone. The rotatable ring can be passive, can include damping, for example, frictional or viscous damping, or can be actively turned about the cone, such as, for example, by a motor drive. The turning of the rotatable ring can be used to control the opening speed of a foldable reflector. For example, in some cases, a passively opened foldable reflector might snap open, perhaps opening too quickly, possibly with some risk of damage to one or more components of the foldable reflector.

Where there are two layers of spokes, the second layer spokes as deployed by the rotation of the rotatable ring can control the speed of opening of the foldable reflector, such as slowing a passively deployed foldable reflector by damping. An actively controlled rotatable ring can actively deploy the foldable reflector in a controlled manner at a controlled speed of deployment. An actively controlled rotatable ring can also be used to actively retract a foldable reflector.

Figure 5B:
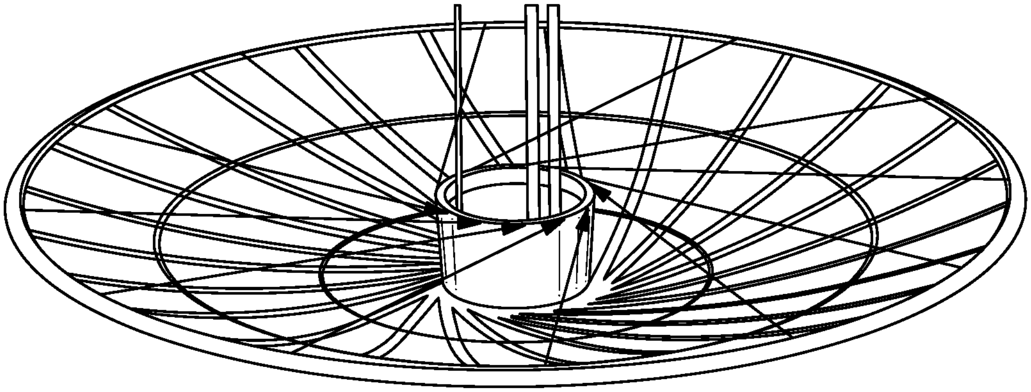
FIG. 5B is a drawing showing a reflector with a rotatable cone ring deployed in a fully open state.
Figure 5C:
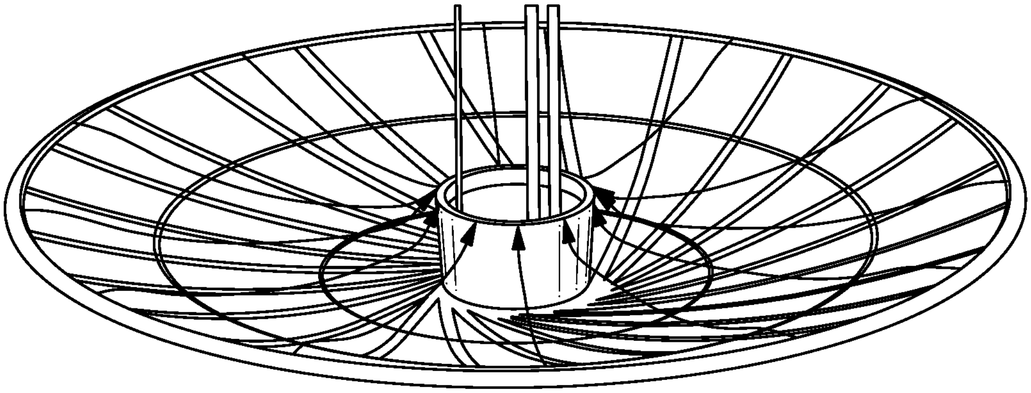
FIG. 5C is a drawing showing the spokes transitioning from being used to control deployment to being used to stabilize and shape the reflector.
Figure 5D:
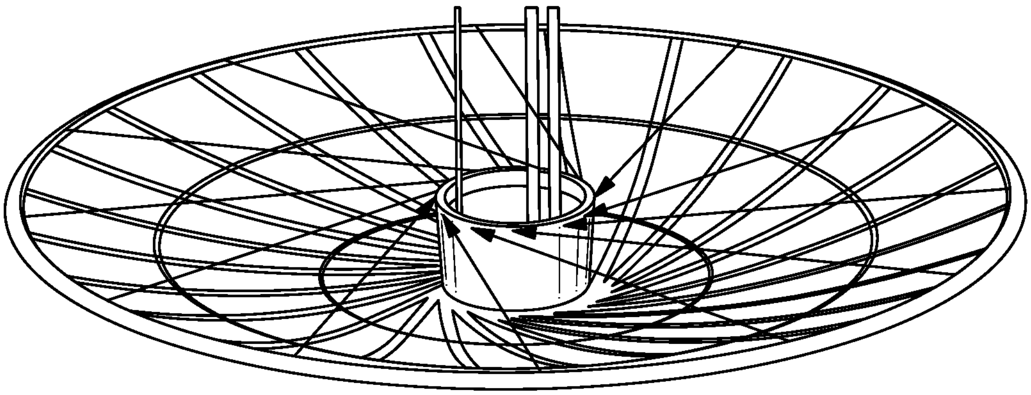
FIG. 5D is a drawing showing the spokes now being used to stabilize and shape the reflector.

FIG. 5B to FIG. 5D show how a rotatable ring on the central cone can be used to stabilize and/or change the shape of the reflector. A rotatable ring can be used alone with a single layer or single set of spokes. Or, a rotatable ring can be used to provide a second layer or second set of spokes, as shown in FIG. 5A FIG. 5B is a drawing showing a reflector with a rotatable cone ring deployed in a fully open state, at the end of a deployment. Ring rotation was used to control deployment of the reflector and to pay out the spokes attached to the rotatable ring. FIG. 5B captures the last stage of using the spokes to control deployment.

FIG. 5C is a drawing showing the spokes transitioning from being used to control deployment to being used to stabilize and shape the reflector. From FIG. now the ring continues to rotate causing the spokes to go slack as shown in FIG.

Figure 6A:
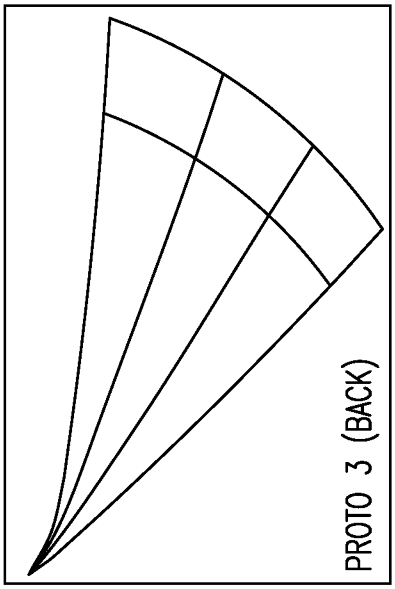
FIG. 6A is a drawing showing a back view of an exemplary gore.
Figure 6B:
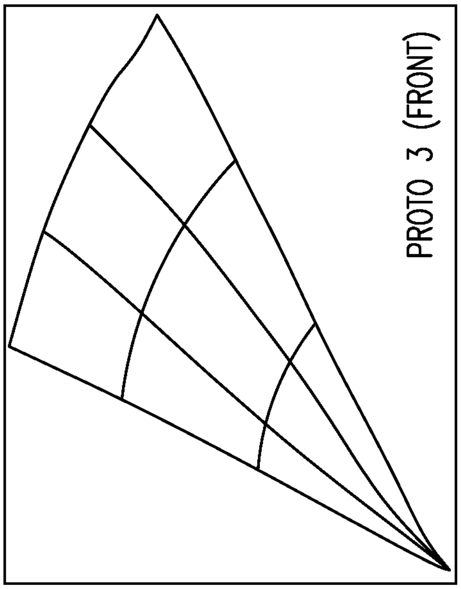
FIG. 6B is a drawing showing a front view of the gore of FIG. 6A.
Figure 6C:
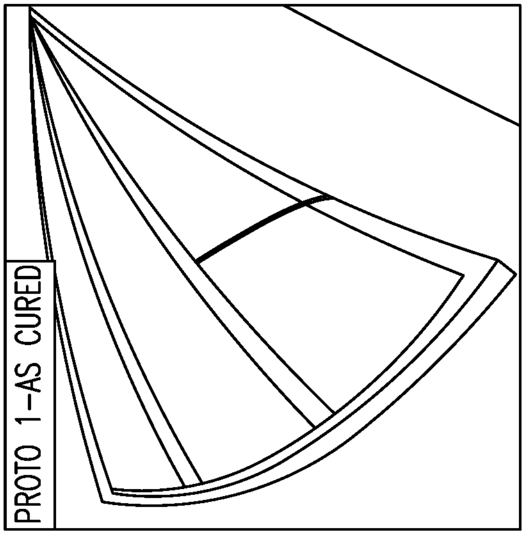
FIG. 6C is a drawing showing an as cured back view of an exemplary gore.
Figure 6D:
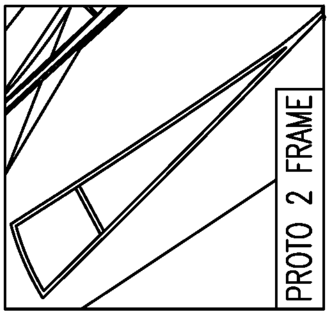
FIG. 6D is a drawing showing an exemplary gore frame with one mid cross element.
Figure 6E:
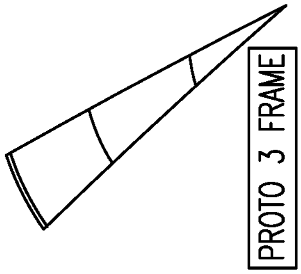
FIG. 6E is a drawing showing an exemplary gore frame with two mid cross element.

FIG. 5D is a drawing showing the spokes now being used to stabilize and shape the reflector. From FIG. 5C, the ring in FIG. 5D is rotated into a final position causing the spokes to tension and shape the reflector. The total rotation of the ring from the end of deployment to this position is about 180°. FIG. 6A to FIG. 6E show an improved gore design. FIG. 6A is a drawing showing a back view of an exemplary gore. FIG. 6B is a drawing showing a front view of the gore of FIG. 6A. FIG. 6C is a drawing showing an as cured back view of an exemplary gore. FIG. 6D is a drawing showing an exemplary gore frame with one mid cross element. FIG. 6E is a drawing showing an exemplary gore frame with two mid cross elements. The gore mass is reduced by thinning the central regions of the gore and leaving a frame that is thicker than the central regions. This allows the overall stiffness of the gore to be increased using less material than a gore with uniform thickness.

Figure 7:
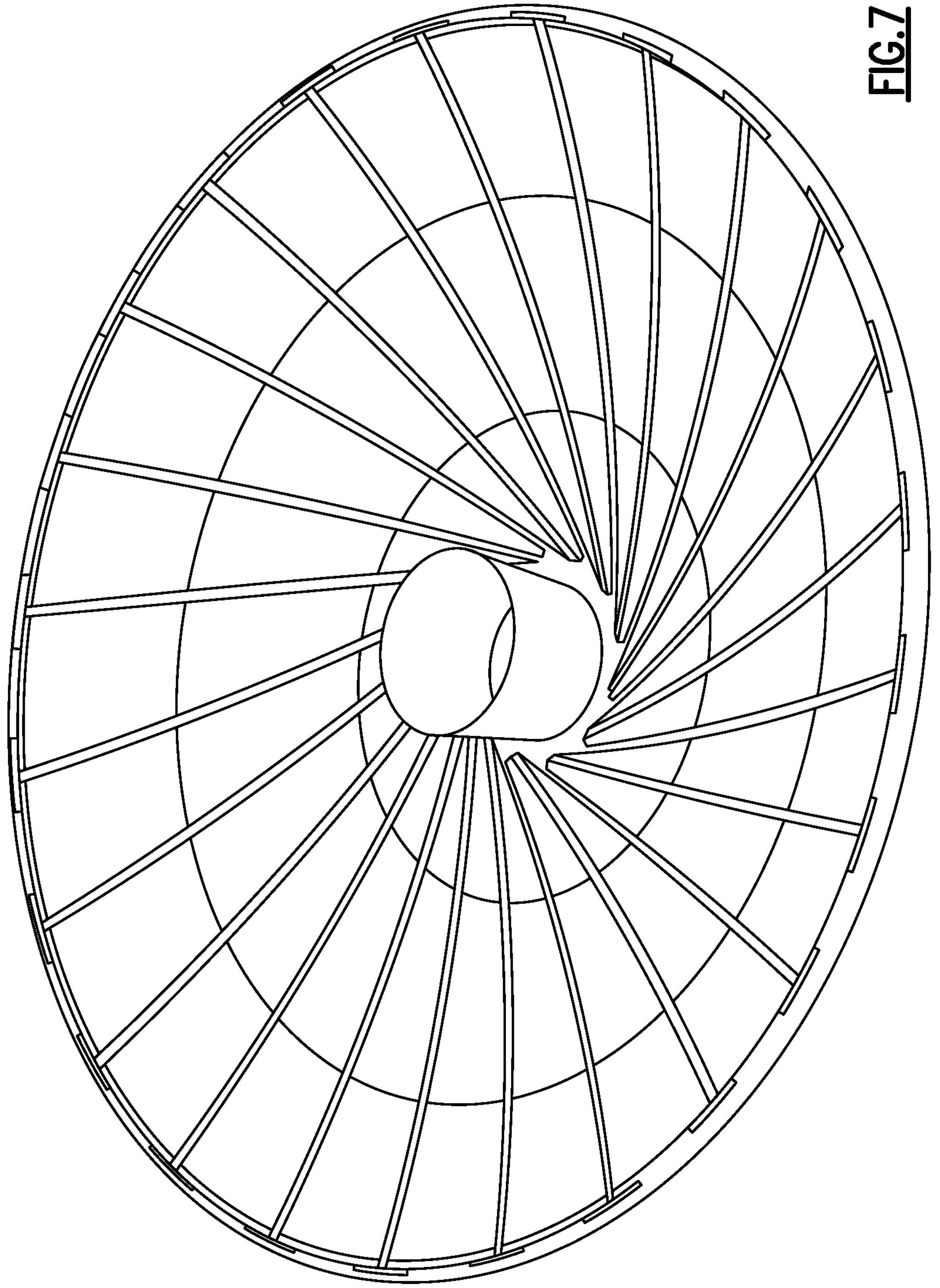
FIG. 7 is a drawing showing a design where the gores are hingedly coupled to the central cone.
Figure 8A:
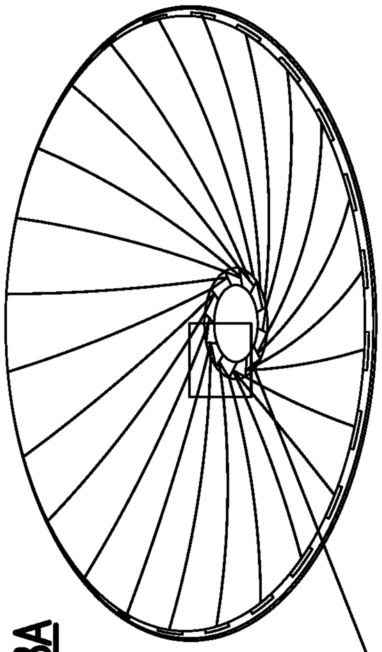
FIG. 8A is a drawing showing a reflector of the type of FIG. 7, where the gores are hingedly coupled to the central cone.
Figure 8B:
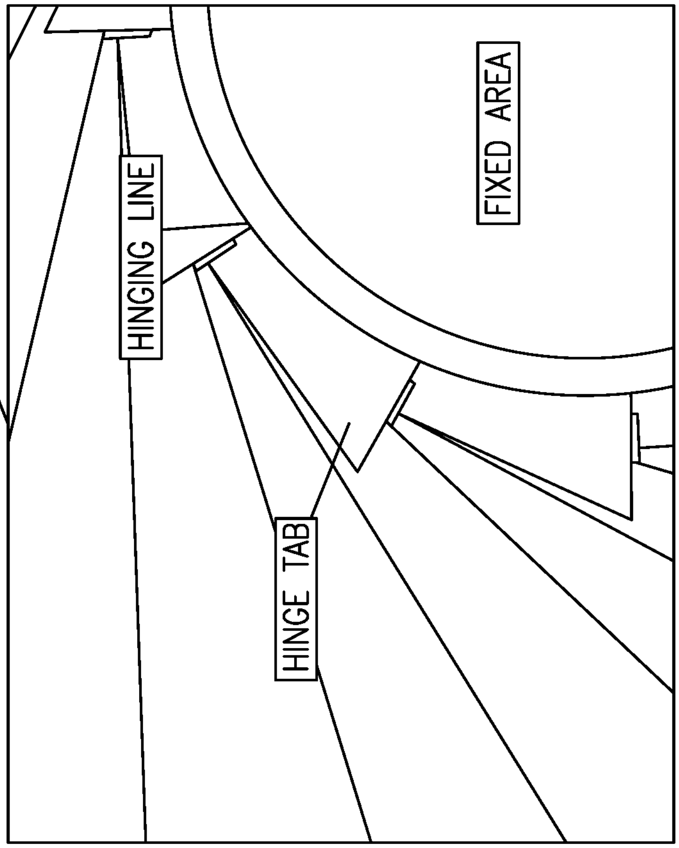
FIG. 8B is a drawing showing a hinge tab in more detail of the reflector of FIG. 8A.

FIG. 7, FIG. 8A, and FIG. 8B show improved gore design. The gore mass is reduced by thinning the central regions of the gore and leaving a frame that is thicker than the central regions. This allows the overall stiffness of the gore to be increased using less material than a gore with uniform thickness.

FIG. 7 is a drawing showing a design where the gores are hingedly coupled to the central cone.

FIG. 8A is a drawing showing a reflector of the type of FIG. 7, where the gores are hingedly coupled to the central cone. FIG. 8B is a drawing showing a hinge tab in more detail of the reflector of FIG. 8A.

Figure 9A:
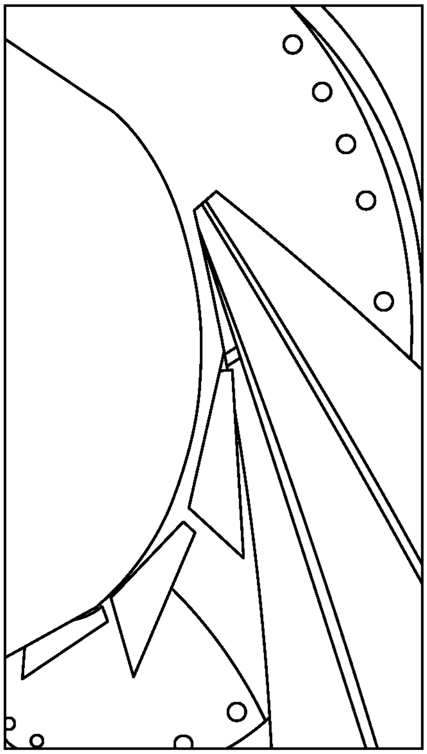
FIG. 9A is a drawing showing a partly unfolded, foldable gore attached near the base of the central cone by a hinge.
Figure 9C:
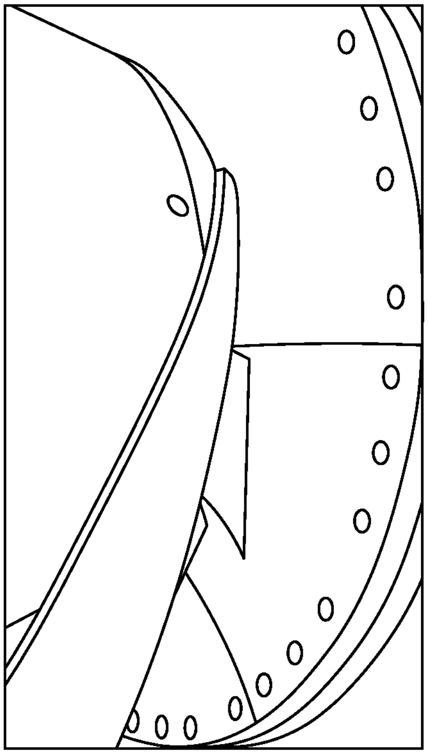
FIG. 9C is a drawing showing the mostly folded and partly rolled, foldable gore of FIG. 9A.
Figure 9B:
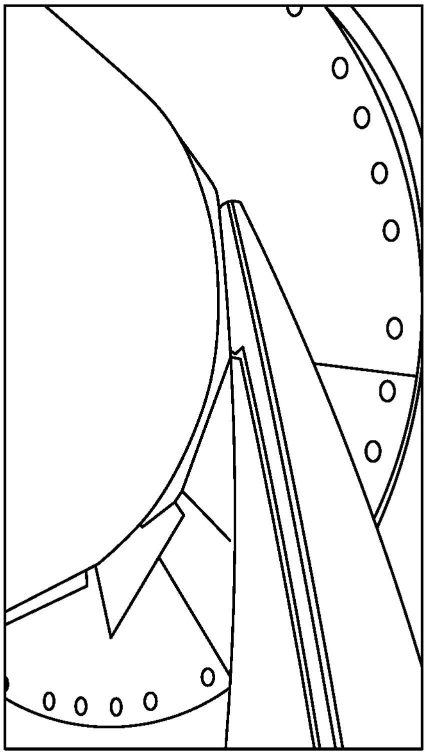
FIG. 9B is a drawing showing the partly folded, foldable gore of FIG. 9A.
Figure 9D:
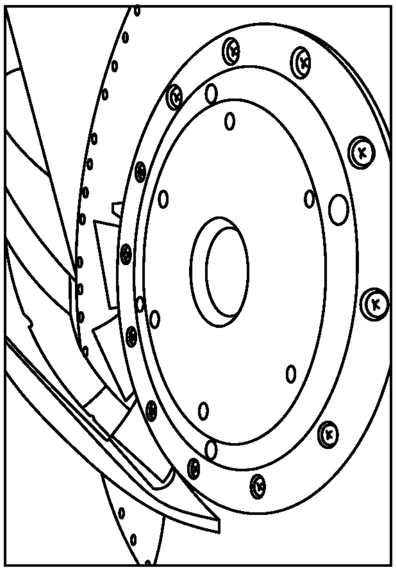
FIG. 9D is a drawing showing another view of the mid fold and partly rolled, foldable gore of FIG. 9A.

FIG. 9A to FIG. 9D show an experimental implantation of a foldable reflector with tensioned cable spoke system with a hinged frame gore reflector. FIG. 9A is a drawing showing a partly unfolded, foldable gore attached near the base of the central cone by a hinge. FIG. 9B is a drawing showing the partly folded, foldable gore of FIG. 9A. FIG. 9C is a drawing showing the mostly folded and partly rolled, foldable gore of FIG. 9A. FIG. 9D is a drawing showing another view of the mid fold and partly rolled, foldable gore of FIG. 9A.

Figure 10A:
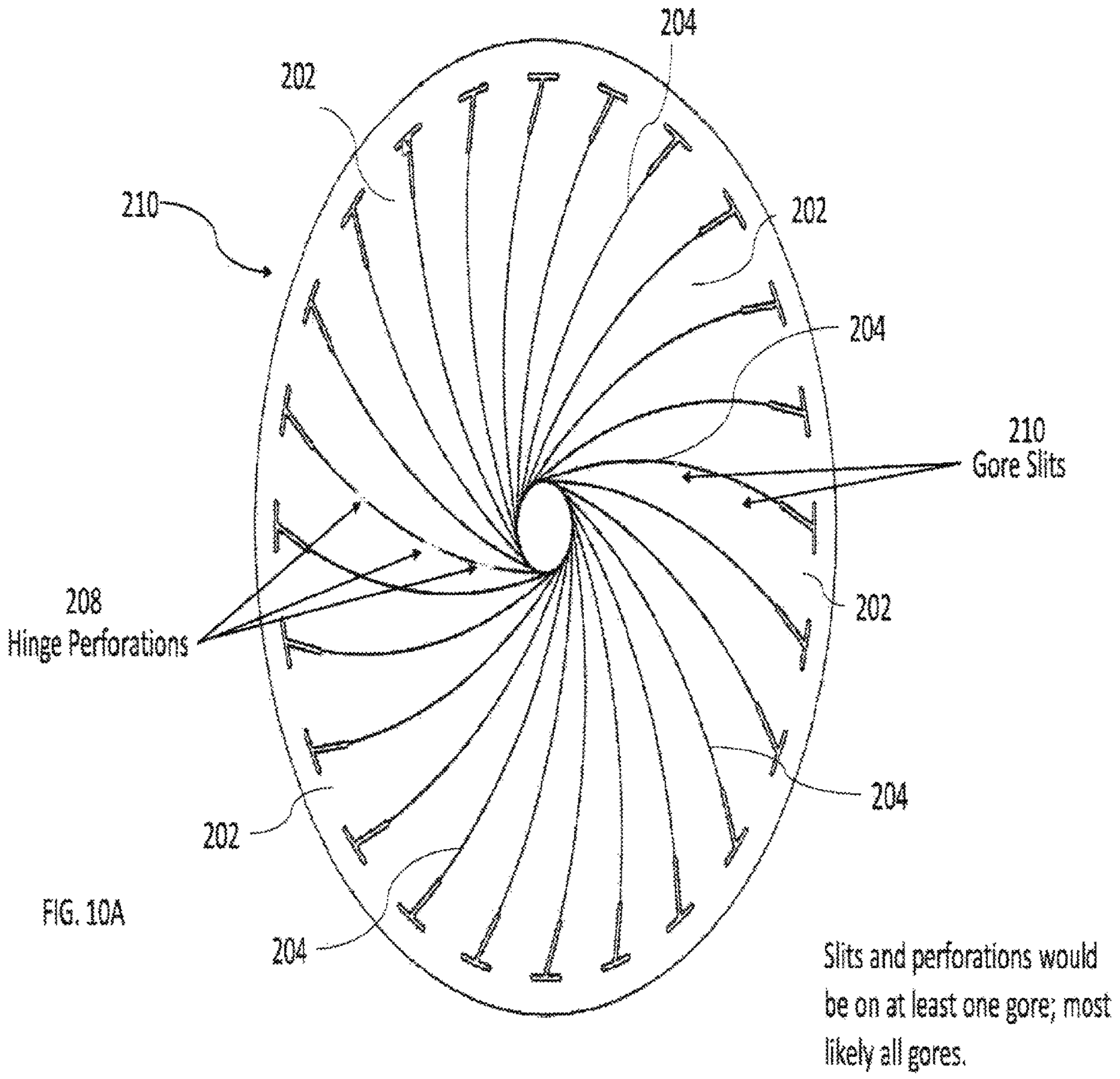
FIGS. 10A and 10B are top plan and perspective views respectively of another illustrative embodiment of exemplary foldable reflector with tensioned cable spoke system.
Figure 10B:
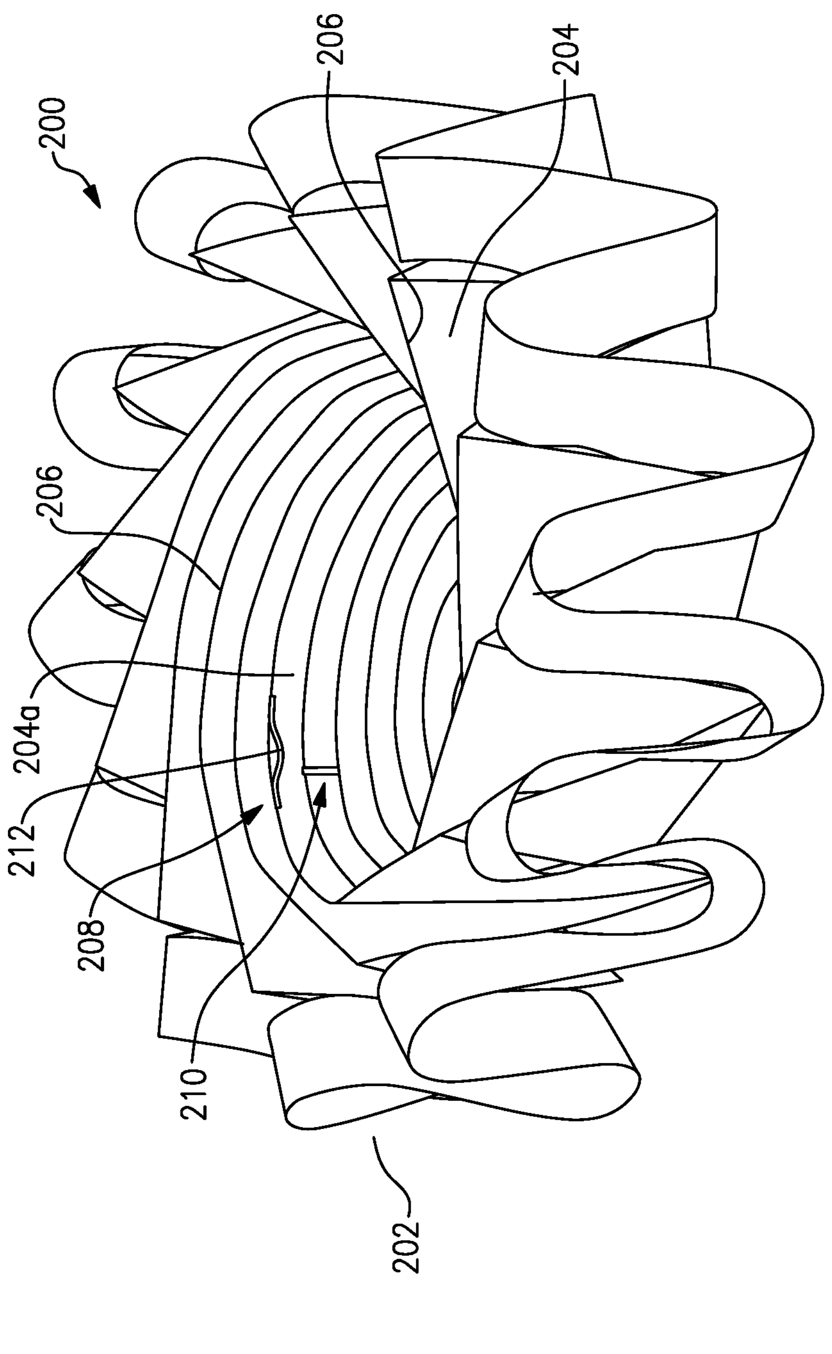

FIGS. 10A and 10B are top plan and perspective views respectively of another illustrative embodiment of exemplary foldable reflector with tensioned cable spoke system. The foldable reflector system 200 includes a foldable reflector 202 having a plurality of gores or reflector elements 204 with adjacent reflector elements 204 foldable along fold or hinge lines 206 at least partially separating the adjacent reflector elements 202. At least one hinge line 206 may include one or more perforations 208 along its length. In some embodiments, more than one hinge line 206 includes perforations 208. In other embodiments, each fold 206 line includes one or more perforations 208. At least one or more reflector elements 204 includes one or more slits 210 arranged transverse to the hinge lines 206. Multiple slits 210 may be provided in spaced relation to each other. In the folded or at least partially folded condition of the foldable reflector 202, the perforations 208 enable the reflector element, e.g., an inner layer 204*a* and/or an inner reflector element 204 of the folded reflector 202, more specifically at least a portion of the layer 204*a* adjacent the hinge line 206, identified schematically as reference numeral 212 to buckle inwardly. This buckling alleviates compressive stress on the inner layer or reflector element 204 to prevent distortion (e.g., crumpling) of the reflective material. The multiple slits 210 also release compressive forces on the reflector element 204 when in an at least partially or folded condition of the foldable reflector 202.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A reflector apparatus, which comprises:

a central member comprising a cone having a first end and a second end;

a foldable reflector coupled to the first end of the cone, the foldable member configured to transition between a deployed condition and a non-deployed condition, the foldable reflector defining a reflective surface in a deployed state for reflecting electromagnetic radiation; and an outer reflector ring comprising a continuous annular frame structurally independent of the foldable reflector surface and hingedly coupled to a peripheral portion of the foldable reflector; and a plurality of tensioned cable spokes, each mechanically coupled between the second end of the cone and the outer reflector ring, the cable spokes being substantially tangentially coupled at the second end of the cone, wherein radially oriented load bearing members extending between the cone and the outer reflector ring consist essentially of the tensioned cable spokes, and configured to support the foldable reflector when at least in the deployed condition.

2. The reflector apparatus of claim 1 wherein the foldable reflector comprises a plurality of reflector elements, adjacent foldable elements foldably coupled to each other to enable the foldable reflector to transition to the nondeployed condition.

3. The reflector apparatus of claim 2 including an outer ring coupled to a peripheral portion of the foldable reflector, the plurality of tensioned cable spokes coupled to the outer ring.

4. The reflector apparatus of claim 3 including a plurality of spokes, each spoke coupled to the central member and the outer reflector ring, wherein each spoke is coupled between a spoke-termination ring disposed at the second end of the cone and the outer reflector ring and is substantially tangentially coupled at the second end of the cone.

5. The reflector apparatus of claim 4 wherein the reflector elements are foldably coupled to the central member.

6. The reflector apparatus of claim 5 wherein the reflector elements are coupled to one end segment of the central segment and the spokes are coupled to an opposed end segment of the central segment, wherein the opposed end segment comprises the second end of the cone and includes the spoke-termination ring.

7. A foldable reflector with tensioned cable spoke system comprising:

a foldable reflector comprising a plurality of foldable reflector elements hingedly coupled to each other configured to reflect electromagnetic radiation;

a central cone extending outward from a center of said foldable reflector, said central cone having a first end and a second end;

an outer reflector ring comprising a continuous annular frame structurally independent of the foldable reflector surface and hingedly coupled to said foldable reflector at an outer perimeter of said foldable reflector; and a plurality of cable spokes, each of said cable spokes mechanically coupled between the second end of said central cone and said outer reflector ring, wherein radially oriented structural members extending between the central cone and the outer reflector ring consist essentially of tensioned cable spokes, the cable spokes substantially tangentially coupled at the second end of the central cone.

8. The foldable reflector with tensioned cable spoke system of claim 7, wherein said foldable reflector comprises a plurality of foldable reflector elements hingedly coupled to each other, said plurality of foldable reflector elements forming a reflective surface in a deployed state.

9. The foldable reflector with tensioned cable spoke system of claim 7, wherein said central cone comprises a cable spoke termination ring disposed near or at the second end of said central cone, opposite to a first end of said central cone coupled to said foldable reflector.

10. The foldable reflector with tensioned cable spoke system of claim 7, wherein said central cone comprises the first end at said foldable reflector and the second end opposite said first end, and said first end and said second end have a substantially same radius, said central cone comprising a cylinder.

11. The foldable reflector with tensioned cable spoke system of claim 7, wherein said central cone comprises the first end at said foldable reflector and the second end opposite said first end, and said first end of said central cone having a first end radius greater than a second end radius.

12. The foldable reflector with tensioned cable spoke system of claim 7, wherein said plurality of cable spokes are tangentially coupled to the second end of said central cone.

13. The foldable reflector with tensioned cable spoke system of claim 7, wherein at least one cable spoke of said plurality of cable spokes comprises an adjustable cable spoke having an adjustable length defined by a distance between said central cone and said outer reflector ring.

14. The foldable reflector with tensioned cable spoke system of claim 13, including a drive device selected from the group consisting of a motor, an actuator, and a piezo electric device to adjust the adjustable length of the adjustable cable spoke.

15. The foldable reflector with tensioned cable spoke system of claim 7, wherein at least one cable spoke of said plurality of cable spokes comprises an adjustable length to compensate for a dynamic force.

16. The foldable reflector with tensioned cable spoke system of claim 7, wherein at least one cable spoke of said plurality of cable spokes comprises an adjustable length to an adjustable length adjusted to compensate for a wavefront or optical correction.

17. The foldable reflector with tensioned cable spoke system of claim 7, comprising a second cone ring disposed near a first cone ring, said second cone ring terminating a second set of cable spokes disposed between said central cone and said outer reflector ring.

18. The foldable reflector with tensioned cable spoke system of claim 17, wherein said second cone ring rotates to control a deployment or a retraction of said foldable reflector.

19. The foldable reflector with tensioned cable spoke system of claim 17, wherein said second cone ring comprises a motor driven second cone ring.

20. The foldable reflector with tensioned cable spoke system of claim 17, wherein said second cone ring comprises a rotary friction damper operatively coupled to the second cone ring and configured to resist rotation by frictionally engaging an annular circumferential surface of the second cone ring.

* * * * *